(12) United States Patent
Iisaka et al.

(10) Patent No.: US 9,368,849 B2
(45) Date of Patent: Jun. 14, 2016

(54) CARBONACEOUS MATERIAL FOR LITHIUM-AIR BATTERY CATHODES AND LITHIUM BATTERY

(71) Applicant: NISSHINBO HOLDINGS INC., Tokyo (JP)

(72) Inventors: Hirofumi Iisaka, Nagoya (JP); Takeaki Kishimoto, Chiba (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 0 days.

(21) Appl. No.: 14/437,562

(22) PCT Filed: Sep. 30, 2013

(86) PCT No.: PCT/JP2013/076554
§ 371 (c)(1),
(2) Date: Apr. 22, 2015

(87) PCT Pub. No.: WO2014/065082
PCT Pub. Date: May 1, 2014

(65) Prior Publication Data
US 2015/0288040 A1    Oct. 8, 2015

(30) Foreign Application Priority Data

Oct. 23, 2012   (JP) ................................. 2012-233974

(51) Int. Cl.
*H01M 4/133* (2010.01)
*H01M 4/13* (2010.01)
*H01M 12/08* (2006.01)
(Continued)

(52) U.S. Cl.
CPC ............... *H01M 12/08* (2013.01); *C01B 31/02* (2013.01); *H01M 4/96* (2013.01); *H01M 4/382* (2013.01); *H01M 2004/8689* (2013.01); *Y02E 60/50* (2013.01)

(58) Field of Classification Search
None
See application file for complete search history.

(56) References Cited

U.S. PATENT DOCUMENTS 6,881,680 B2 *   4/2005   Fujita ............................ 438/758
2011/0245071 A1  10/2011  Tanabe

FOREIGN PATENT DOCUMENTS

JP   2010-9807 A    1/2010
JP   2010-182606 A  8/2010
(Continued)

OTHER PUBLICATIONS

Jun-Ichi Ozaki, et al., "Enhancement of Oxygen reduction activity of nanoshell carbons by introducing nitrogen atoms from metal phthalocyanines", Electrochimica Acta, 2010, pp. 1864-1871, vol. 55 On Line: Oct. 21, 2009.

(Continued)

*Primary Examiner* — Cynthia K Walls
(74) *Attorney, Agent, or Firm* — Sughrue Mion, PLLC

(57) ABSTRACT

The present invention is to provide a carbonaceous material for lithium-air battery cathodes, which shows higher capacity than conventional carbonaceous materials. Disclosed are a carbonaceous material for lithium-air battery cathodes, wherein the carbonaceous material is a carbonaceous material for constituting the cathode of a lithium-air battery; wherein the carbonaceous material comprises nitrogen and a molar ratio of the nitrogen to the carbon is $1.9 \times 10^{-2}$ or more; and wherein the carbonaceous material is a glassy material, and a lithium-air battery comprising a cathode, wherein the cathode comprises the carbonaceous material.

6 Claims, 10 Drawing Sheets

(1A)

(1B)

(51) Int. Cl.
  *H01M 4/96* (2006.01)
  *C01B 31/02* (2006.01)
  *H01M 4/38* (2006.01)
  *H01M 4/86* (2006.01)

(56) References Cited

FOREIGN PATENT DOCUMENTS

| JP | 2011-198636 A | 10/2011 |
| JP | 2011-225431 A | 11/2011 |
| JP | 2012-182050 A | 9/2012 |
| JP | 2013-109896 A | 6/2013 |
| JP | 2013-159519 A | 8/2013 |
| JP | 2013-165051 A | 8/2013 |

OTHER PUBLICATIONS

Hirofumi Iisaka, et al., "Analysis of air electrode catalyst for Li-air rechargeable battery", Extended Abstract of the 51st battery symposium in Japan, Nov. 8, 2010, p. 134, The Committee of Battery Technology, The electrochemical Society in Japan.

Eiichi Yasuda, et al., "Dictionary of Carbon Terms", First Edition, Oct. 5, 2000, pp. 63-64, Published by AGNE SHOFU Publishing Inc.

JPO Office Action for Application No. 2012-233974 dated Dec. 9, 2014. Partial English translation.

International Search Report for PCT/JP2013/076554 dated Dec. 3, 2013 [PCT/ISA/210].

* cited by examiner (After discharging)

(After charging)

(1A)

(After discharging)

(After charging)

(1B)

(8A)

(8B)

Area observed with electron microscope

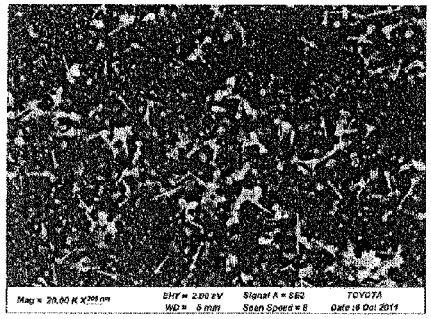
(11A) Fig. 11A
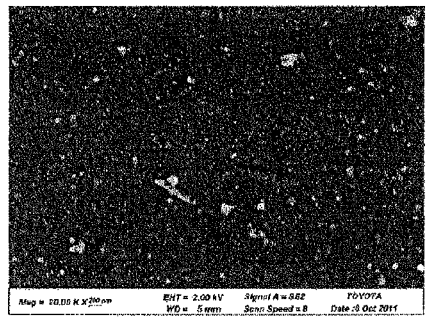
(11B) Fig. 11B
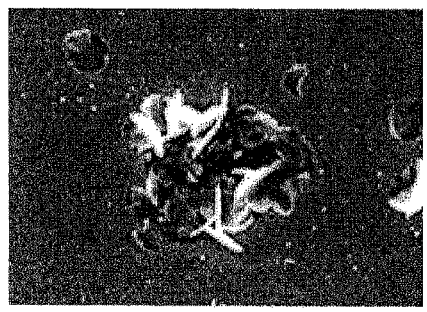
(12A) Fig. 12A
(12B) Fig. 12B
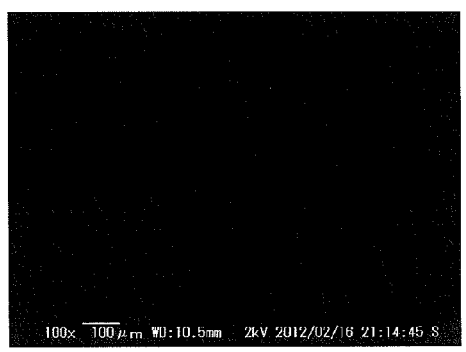
(13A) Fig. 13A
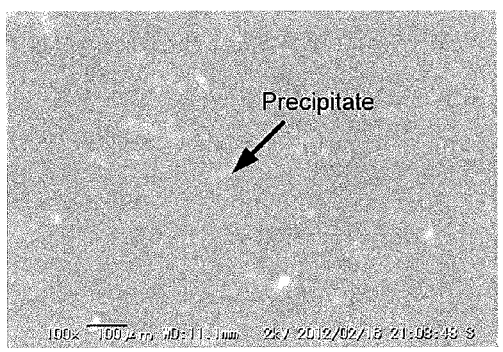
(13B) Fig. 13B

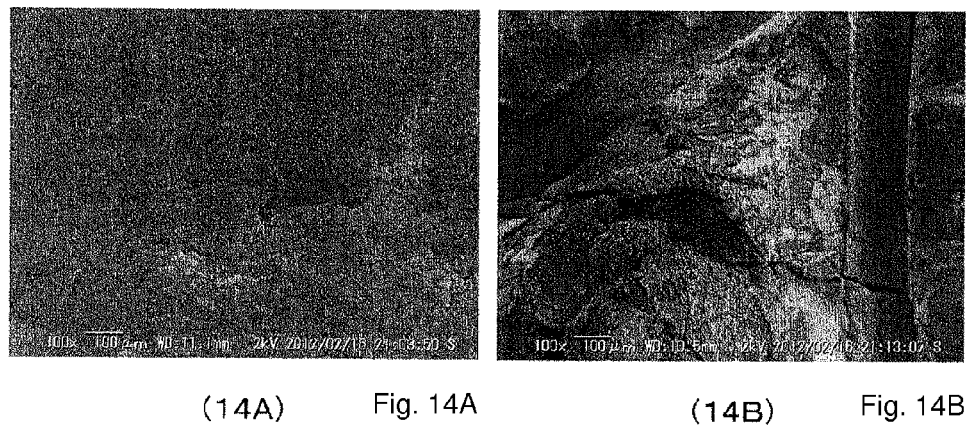
(14A) Fig. 14A    (14B) Fig. 14B
Fig. 15
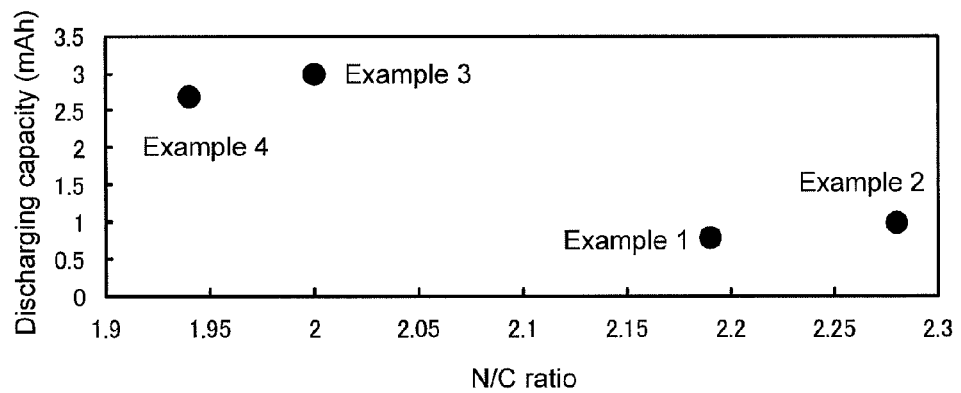

CARBONACEOUS MATERIAL FOR LITHIUM-AIR BATTERY CATHODES AND LITHIUM BATTERY

CROSS REFERENCE TO RELATED APPLICATIONS

This application is a National Stage of International Application No. PCT/JP2013/076554, filed on Sep. 30, 2013, which claims priority from Japanese Patent Application No. 2012-233974, filed on Oct. 23, 2012, the contents of all of which are incorporated herein by reference in their entirety.

TECHNICAL FIELD

The present invention relates to a carbonaceous material for constituting the cathode of a lithium-air battery, and a lithium-air battery comprising a cathode containing the carbonaceous material.

BACKGROUND ART

An air battery that uses oxygen as the cathode active material has advantages such as high energy density, easiness of reducing size and weight, etc. Therefore, it attracts attention as a high-capacity battery which exceeds lithium secondary batteries that are widely used now. Among air batteries, the lithium-air battery has become an active area of research due to its high capacity.

The lithium-air battery is able to charge and discharge since an oxidation-reduction reaction of oxygen is carried out in the cathode (air electrode) and an oxidation-reduction reaction of lithium is carried out in the anode. In the lithium-air secondary battery, it is considered that the following charging/discharging reactions proceed.

[Upon Discharging]
Anode:
Cathode:
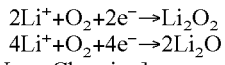

[Upon Charging]
Anode:
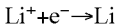
Cathode:
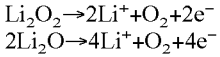

The lithium-air battery comprises, for example, the following: a cathode containing a carbonaceous material and a binder; a cathode current collector that collects current from the cathode; an anode containing an anode active material (such as metal or alloy); an anode current collector that collects current from the anode; and an electrolyte disposed between the cathode and the anode. Sometimes, a catalyst is contained in the cathode.

For example, in Patent Literature 1, a lithium-air battery comprising carbon and a binder as constitutional components is disclosed.

In Patent Literature 2, a method for producing an oxygen reduction catalyst is disclosed, which is not limited to the use for metal-air batteries. In particular, a method for producing an oxygen reduction catalyst is disclosed in Patent Literature 2, the catalyst containing a transition metal oxide in which the crystal lattice is expanded by introducing oxygen defects into the surface and replacing part of oxygen atoms on the surface by at least one of carbon atoms and nitrogen atoms. In Patent Literature 3, a fuel cell catalyst for the air electrode of fuel cells is disclosed, which is not for metal-air batteries.

CITATION LIST

Patent Literature 1: Japanese Patent Application Laid-Open (JP-A) No. 2010-182606
Patent Literature 2: JP-A No. 2011-198636
Patent Literature 3: JP-A No. 2010-009807

SUMMARY OF INVENTION

Technical Problem

However, the cathode comprising the carbon disclosed in Patent Literature 1 has such a problem that the capacity to be obtained is small.

The present invention was achieved in light of the above circumstances. An object of the present invention is to provide a carbonaceous material for lithium-air battery cathodes, which shows higher capacity than conventional carbonaceous materials, and a lithium-air battery comprising the carbonaceous material.

Solution to Problem

The carbonaceous material of the present invention is a carbonaceous material for lithium-air battery cathodes, wherein the carbonaceous material is a carbonaceous material for constituting the cathode of a lithium-air battery; wherein the carbonaceous material comprises nitrogen and a molar ratio of the nitrogen to the carbon is $1.9 \times 10^{-2}$ or more; and wherein the carbonaceous material is a glassy material.

According to the carbonaceous material for lithium-air battery cathodes of the present invention, the discharging capacity of a lithium-air battery can be increased.

In the carbonaceous material for lithium-air battery cathodes according to the present invention, when the molar ratio of the nitrogen to the carbon is $1.90 \times 10^{-2}$ to $2.10 \times 10^{-2}$, an especially high discharging capacity can be obtained.

Also in the carbonaceous material for lithium-air battery cathodes according to the present invention, when the molar ratio of the nitrogen to the carbon is $1.95 \times 10^{-2}$ to $2.25 \times 10^{2}$, both the discharging capacity and coulombic efficiency of a lithium-air battery can be increased.

When the carbonaceous material for lithium-air battery cathodes according to the present invention comprises pyrrole and a molar ratio of the pyrrole to the carbon is $1.44 \times 10^{-2}$ to $1.52 \times 10^{-2}$, a particularly high discharging capacity can be obtained.

When the carbonaceous material for lithium-air battery cathodes according to the present invention comprises pyridine and a molar ratio of the pyridine to the carbon is $0.47 \times 10^{-2}$ to $0.50 \times 10^{-2}$, a lithium-air battery can obtain a high discharging capacity, and the coulombic efficiency can be also increased.

The lithium-air battery of the present invention is a lithium-air battery comprising a cathode, an anode and an electrolyte disposed between the cathode and the anode, wherein the cathode comprises the carbonaceous material of the present invention. The lithium-air battery of the present invention can exhibit better discharge characteristics than ever before.

Advantageous Effects of Invention

Compared to conventional carbonaceous materials constituting lithium-air batteries, the carbonaceous material of the present invention has excellent discharging capacity and can contribute to enhancing the discharge characteristics of lithium-air batteries.

BRIEF DESCRIPTION OF DRAWINGS

FIG. 11A is an SEM image of the cathode surface of Example 1, which was taken after discharging.

FIG. 11B is an SEM image of the cathode surface of Example 1, which was taken after charging.

FIG. 12A is an SEM image of the cathode surface of Comparative Example 1, which was taken after discharging.

FIG. 12B is an SEM image of the cathode surface of Comparative Example 1, which was taken after charging.

FIG. 13A is an SEM image of the cathode surface of Example 3, which was taken before the charge-discharge test.

FIG. 13B is an SEM image of the cathode surface of Example 3, which was taken after the charge-discharge test.

FIG. 14A is an SEM image of the cathode surface of Comparative Example 2, which was taken before the charge-discharge test.

FIG. 14B is an SEM image of the cathode surface of Comparative Example 2, which was taken after the charge-discharge test.

FIG. 15 is a graph showing the relationship between the N/C ratio and discharging capacity of Examples 1 to 4.

DESCRIPTION OF EMBODIMENTS

[Carbonaceous Material for the Cathode of a Lithium-Air Battery]

The carbonaceous material of the present invention is a carbonaceous material for lithium-air battery cathodes (hereinafter may be simply referred to as "carbonaceous material") wherein the carbonaceous material is a carbonaceous material for constituting the cathode of a lithium-air battery; wherein the carbonaceous material comprises nitrogen and a molar ratio of the nitrogen to the carbon is $1.9 \times 10^{-2}$ or more; and wherein the carbonaceous material is a glassy material.

Figure 10:
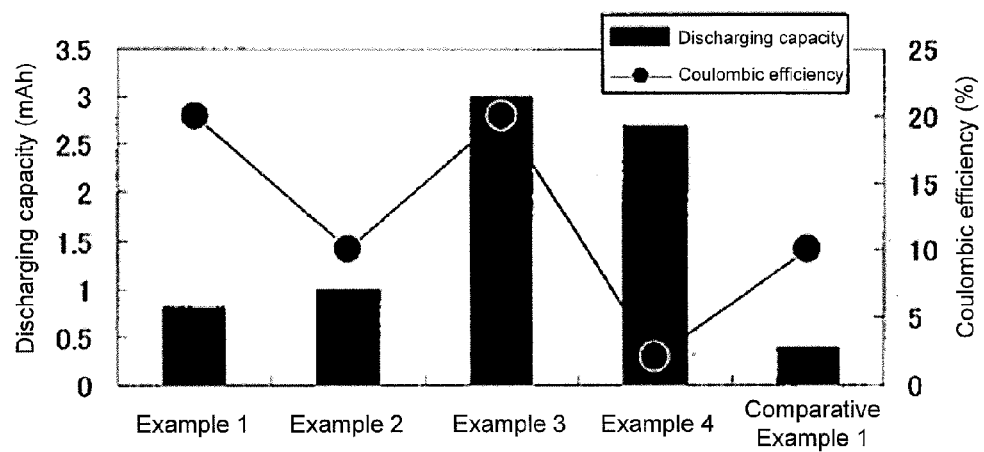
FIG. 10 is a graph showing the coulombic efficiencies and discharging capacities of Examples 1 to 4 and Comparative Example 1.

The inventors of the present invention have found that the discharging capacity of a lithium-air battery can be increased higher by constituting the cathode of a lithium-air battery with a glassy carbonaceous material containing a specific amount of nitrogen, compared to the case of using conventional carbonaceous materials. More specifically, when the cathode is formed by using a glassy carbon which contains nitrogen and in which the molar ratio of the nitrogen to the carbon is $1.9 \times 10^{-2}$ or more (Examples 1 to 4), as shown in FIG. 10, compared to the case of using a glassy carbonaceous material containing no nitrogen (Comparative Example 1), the discharging capacity is increased twice or more and, in some cases, seven times or more.

The mechanism for increasing the discharging capacity of a lithium-air battery by forming the cathode with the carbonaceous material of the present invention, is not clear. However, it is presumed as follows.

Figure 1A:
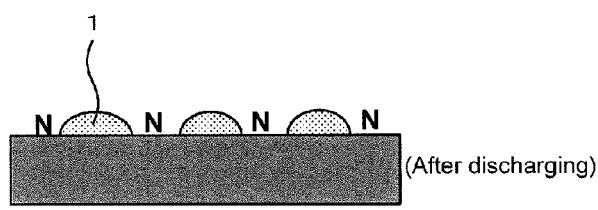
FIG. 1A is a schematic view of the surface of the carbonaceous material according to the present invention, after discharging and after charging.
Figure 1B:
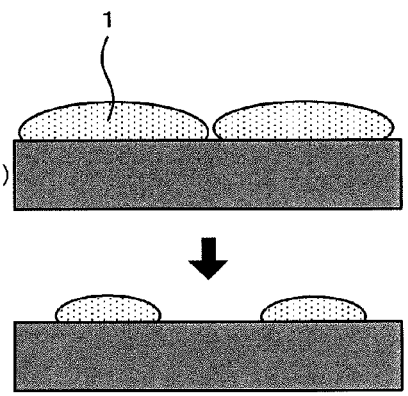
FIG. 1B is a schematic view of the surface of a conventional carbonaceous material containing no nitrogen, after discharging and after charging.

FIG. 1A is a schematic view of the surface of the carbonaceous material according to the present invention, after discharging and upon charging after discharging (i.e., after charging). FIG. 1B is a schematic view of the surface of a conventional carbonaceous material containing no nitrogen, after discharging and upon charging after discharging (i.e., after charging).

As shown in FIG. 1B, on the surface of the conventional carbonaceous material containing no nitrogen, the growth of precipitates produced by discharging, i.e., precipitates 1, is not inhibited and the precipitates 1 grow substantially. In contrast, as shown in FIG. 1A, on the surface of the nitrogen-containing glassy carbonaceous material according to the present invention, the growth of precipitates 1 is inhibited by the nitrogen and, compared to the precipitates produced on the surface of the conventional carbonaceous material, smaller and more precipitates 1 are produced thereon. It is thought that because, as just described, many small precipitates are produced on the surface of the carbonaceous material of the present invention, the discharging capacity is increased. It has been confirmed by the inventors of the present invention that the size and number of precipitates produced on the carbonaceous material of the present invention by discharging, are smaller than the carbonaceous material containing no nitrogen (see the below-described FIGS. 11A and 12A).

Also, upon charging after discharging, as shown in FIG. 1B, large precipitates produced upon discharging are not decomposed and remain on the surface of the conventional carbonaceous material. In contrast, as shown in FIG. 1A. 1, on the surface of the nitrogen-containing glassy carbonaceous material according to the present invention, small precipitates are produced upon discharging, and decomposition of the precipitates is promoted by the nitrogen upon charging, so that the precipitates are less likely to remain. Therefore, it is thought that there is a case where coulombic efficiency can be also increased by using the carbonaceous material of the present invention. It has been confirmed by the inventors of the present invention that the size and number of precipitates that remains on the surface of the carbonaceous material of the present invention after charging and discharging, are smaller than carbonaceous materials containing no nitrogen (see the below-described FIGS. 11B, 12B, 13A, 13B, 14A, and 14B).

Hereinafter, the carbonaceous material of the present invention will be described in detail.

The carbonaceous material of the present invention is used as a carbonaceous material for constituting the cathode of a lithium-air battery. The lithium-air battery will be described below in detail, under "Lithium-air battery".

The carbonaceous material of the present invention is characterized in that it contains nitrogen and the nitrogen content is such that the molar ratio of the nitrogen to the carbon is $1.9 \times 10^{-2}$ or more.

The molar ratio of the nitrogen to the carbon (hereinafter may be referred to as N/C ratio) in the carbonaceous material can be measured by X ray photoelectron spectroscopy (XPS). More specifically, the ratio of the number of the nitrogen atoms to the number of the carbon atoms can be calculated by measuring the atomic spectrum of the nitrogen and that of the carbon by XPS.

From the viewpoint of reducing mechanical processing loads, the N/C ratio is preferably $2.28 \times 10^{-2}$ or less.

From the viewpoint of obtaining a very high discharging capacity, the N/C ratio is preferably $2.10 \times 10^{-2}$ or less, particularly preferably $2.05 \times 10^{-2}$ or less, more particularly preferably $2.00 \times 10^{-2}$ or less. Also, the N/C ratio is preferably $1.90 \times 10^{-2}$ or more, particularly preferably $1.94 \times 10^{-2}$ or more, more particularly preferably $1.95 \times 10^{-2}$ or more.

From the viewpoint of being able to obtain a high discharging capacity and increase the coulombic efficiency, the N/C ratio is preferably $2.25 \times 10^{-2}$ or less, particularly preferably $2.20 \times 10^{-2}$ or less, more particularly preferably $2.19 \times 10^{-2}$ or less. Also, the N/C ratio is preferably $1.95 \times 10^{-2}$ or more, particularly preferably $1.98 \times 10^{-2}$ or more, more particularly preferably $2.00 \times 10^{-2}$ or more.

The carbonaceous material of the present invention is also characterized in that it is a glassy carbonaceous material. The glassy carbonaceous material is one obtained by carbonizing a thermosetting resin by heating at high temperature, and it is also one in which hexagonal network crystallites, which constitute the basic structure of graphite, are organized in a non-oriented manner. Observation with a transmission electron microscope (TEM) can be used to confirm whether the material is a glassy carbonaceous material or not. In particular, when the material is a glassy carbonaceous material, as described above, it can be confirmed that the crystallites are not oriented and form a glassy, complex network structure (see FIG. 8A). In the TEM observation, the network structure can be confirmed by setting the magnification to 10,000 to 100,000×.

The carbonaceous material of the present invention has such a structure that the nitrogen atoms are doped in the carbon framework, and the position of the nitrogen atoms is not particularly limited. For example, there may be mentioned a cyanide type, graphite type, oxide, pyridine type and pyrrole type.

In the carbonaceous material of the present invention, when the nitrogen is contained as pyrrole, the molar ratio of the pyrrole to the carbon (hereinafter may be referred to as "pyrrole/C ratio") is preferably $1.44 \times 10^{-2}$ or more, particularly preferably $1.46 \times 10^{-2}$ or more, more particularly preferably $1.47 \times 10^{-2}$ or more. Also, the pyrrole/C ratio is preferably $1.52 \times 10^{-2}$ or less, particularly preferably $1.50 \times 10^{-2}$ or less, more particularly preferably $1.48 \times 10^{-2}$ or less. This is because a very high discharging capacity can be obtained when the pyrrole/C ratio is within the above range.

In the carbonaceous material of the present invention, when the nitrogen is contained as pyridine, the molar ratio of the pyridine to the carbon (hereinafter may be referred to as "pyridine/C ratio") is preferably $0.47 \times 10^{-2}$ or more, particularly preferably $0.48 \times 10^{-2}$ or more. Also, the pyridine/C ratio is preferably $0.50 \times 10^{-2}$ or less, particularly preferably $0.49 \times 10^{-2}$ or less, more particularly preferably $0.48 \times 10^{-2}$ or less. This is because a high discharging capacity can be obtained and the coulombic efficiency can be increased when the pyridine/C ratio is within the above range. The pyridine/C ratio is particularly preferably $0.48 \times 10^{-2}$.

From the viewpoint of discharging capacity, in the Raman spectral measurement of the carbonaceous material of the present invention, the area ratio of G band derived from graphite to D band derived from defects (=the peak area of G band/the peak area of D band; hereinafter, it may be referred to as "G/D ratio") is preferably 1.5 or less, particularly preferably 1 or less, more particularly preferably 0.7 or less. This is because the amount of carbon defects gets smaller (crystallinity gets higher) as the G/D ratio gets smaller, so that it is considered that precipitates are easily produced upon discharging.

The Raman spectral measurement can be carried out by general methods. In particular, the measurement is preferably carried out as follows. That is, laser light is applied to a sample surface, and backscattered light (light scattered in a direction opposite to the incident direction) is spectroscoped to measure the Raman spectrum by CCD.

From the viewpoint of discharging capacity, the average 002 planar spacing obtained by X-ray diffraction analysis of the carbonaceous material of the present invention, is preferably within a range of 3.7 to 4.2 Å, particularly preferably within a range of 3.75 to 4.1 Å.

In the X-ray diffraction analysis, the average 002 planar spacing can be measured according to general methods. For example, it can be measured according to "Measurement of Lattice Parameters and Crystallite Sizes of Carbon Materials" defined in JIS R7651.

Also from the same viewpoint, for the carbonaceous material of the present invention, in the X-ray diffraction analysis, the size of crystallites in the a-axis direction is preferably within a range of 22 to 27 Å, particularly preferably within a range of 22.5 to 26.3 Å, and the size of crystallites in the c-axis direction is preferably within a range of 11 to 16 Å, particularly preferably within a range of 12.5 to 15 Å.

In the X-ray diffraction analysis, the sizes of crystallites in the a-axis and c-axis directions can be measured according to general methods. For example, they can be measured according to "Measurement of Lattice Parameters and Crystallite Sizes of Carbon Materials" defined in JIS R7651.

The method for producing the carbonaceous material of the present invention is not particularly limited. For example, there may be mentioned the following method.

That is, the carbonaceous material of the present invention can be produced by carbonizing a nitrogen-containing thermosetting resin by heating at 100 to 3,000° C. for 1 to 100 hours.

Examples of nitrogen-containing thermosetting resins include polycarbodiimide resin, nitrogen-containing phenol resin, nitrogen-containing epoxy resin, nitrogen-containing furan resin, polyimide resin, polyamide resin, polyamideimide resin, melamine resin, polyacrylonitrile resin, nitrogen-containing unsaturated polyester resin, and copolymers with monomers that are copolymerizable with repeating units that constitute these resins. Of them, preferred are nitrogen-containing phenol resin, nitrogen-containing furan resin, nitrogen-containing furfural-phenol copolymer, etc. The nitrogen-containing thermosetting resins can be used alone or in combination of two or more kinds.

A curing agent can be used in combination with the nitrogen-containing thermosetting resin. As the curing agent, there may be mentioned sulfuric acid, hydrochloric acid, nitric acid, etc. The curing agent can be a cause for incorporation of impurities or defects, so that the amount used is preferably as small as possible. For example, it is preferably 10 wt % or less of the total amount of the materials.

The carbonaceous material of the present invention can be also produced by imparting heat-curability to a nitrogen-containing thermoplastic resin by mixing the resin with a curing agent, and then carbonizing the thermoplastic resin by heating. As the thermoplastic resin, for example, there may be mentioned nitrogen-containing novolac-type phenol resin. As the curing agent, for example, there may be mentioned hexamethylenetetramine.

Before the carbonization, the nitrogen-containing thermosetting resin can be molded. The method for molding the nitrogen-containing thermosetting resin is not particularly limited, and it can be appropriately selected so that the resin can be molded into a desired form. For example, there may be mentioned a roll-to-roll method, press molding, centrifugal molding, cast molding, injection molding, extrusion molding, pressure molding, etc.

It is preferable to infusibilize the molded nitrogen-containing thermosetting resin as needed by heating under an oxygen atmosphere, in order to fix the form. In the infusibilizing treatment, it is preferable that the oxygen atmosphere has an oxygen concentration of about 10 to 90 vol %, and the heating temperature is about 50 to 500° C.

The nitrogen-containing glassy carbonaceous material obtained by carbonizing the nitrogen-containing thermosetting resin, can be used as it is as the cathode, when the material is in a plate form, foil form or the like, for example. In this case, the nitrogen-containing glassy carbonaceous material obtained by the carbonization is a material that is difficult to process. Therefore, processing loads can be reduced by giving the resin a given form in advance before the carbonizing treatment. More specifically, it is preferable to adjust the outer shape of the resin in accordance with the outer shape of the cathode, after the infusibilizing treatment, by cutting, polishing, etc.

The nitrogen-containing thermosetting resin heating temperature is not particularly limited, as long as it is a temperature at which the resin can be carbonized. It is preferably 300 to 3,000° C., particularly preferably 600 to 1,500° C. When the heating temperature is too low, the orientation of crystallites may be low and sufficient battery characteristics may not be obtained. When the heating temperature is too high, the amount of removed nitrogen is too high and a desired N/C ratio cannot be obtained.

Preferably, the carbonization is carried out in a vacuum (for example, 0.1 MPa or less).

Depending on the heating conditions of the carbonization, the N/C ratio, the pyrrole/C ratio, the G/D ratio, the size of crystallites in the a-axis direction, the size of crystallites in the c-axis direction, and the 002 planar spacing can be controlled. For example, by increasing the heating temperature, the G/D ratio and the 002 planar spacing can be decreased. Also by increasing the heating temperature, the size of crystallites in the a-axis direction and the size of crystallites in the c-axis direction are increased.

By increasing the heating temperature (for example, to 800° C. or more), the following can be expected: the regularity of the orientation of crystallites is increased; carbon nanoshells are formed; and battery characteristics are enhanced. Also by increasing the heating temperature, there is a tendency for electrical resistance to decrease.

In the carbonization of the nitrogen-containing thermosetting resin, the heating is preferably carried out at a heating rate of 5 to 10° C./min, for example. This is because, by heating the resin at such a relatively slow rate, the regularity can be increased due to the orientation of crystallites.

When the thus-obtained nitrogen-containing glassy carbonaceous material is used as it is as the cathode, to increase the flatness of the cathode surface, it is preferable to carry out mirror polishing. Examples of mirror polishing methods include mirror finish polishing using water, alumina grains and an abrasive. The dimensional tolerance of the mirror-polished surface is preferably within a range of about 0.05 to 0.10 mm.

After the carbonization or mirror polishing, impurities, polishing sludge or the like may be attached to the surface of the nitrogen-containing glassy carbonaceous material. Methods for removing them include a method for removing metallic impurities by heating at high temperature (for example, 2,000 to 3,000° C.) under a chlorine gas atmosphere or hydrogen chloride gas atmosphere. However, by such a high temperature treatment, the nitrogen component is eliminated. Therefore, it is preferable to carry out the treatment at a lower temperature than the heating temperature for the carbonization and for a shorter heating time than the heating time of the carbonization.

As described above, the carbonaceous material of the present invention can be used as it is as the cathode, when it is in a plate form, foil form or the like. When it is a powdery or fibrous carbonaceous material, or when it is one obtained by grinding a carbonaceous material in a plate form, foil form or the like, it can be appropriately combined with other component such as a binder, conductive additive or catalyst to form a cathode.

[Lithium-Air Battery]

As described above, the carbonaceous material of the present invention is particularly effective as a carbonaceous material for constituting the cathode of a lithium-air battery. Hereinafter, a lithium-air battery comprising a cathode that contains the carbonaceous material of the present invention, will be described.

Figure 2:
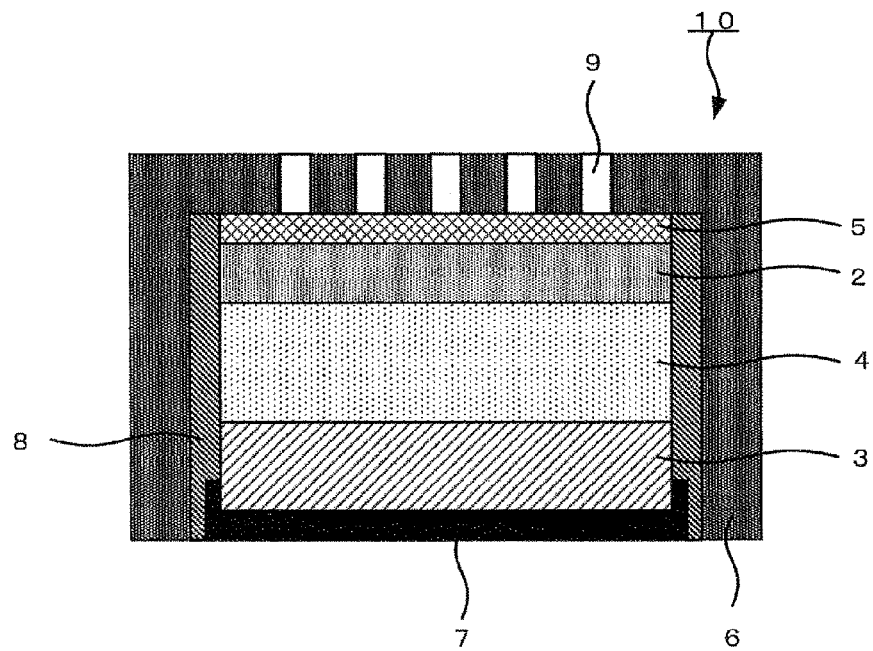
FIG. 2 is a schematic sectional view showing an embodiment of a lithium-air battery.

In a metal-air battery 10 shown in FIG. 2, a cathode (air electrode) 2 that uses oxygen as an active material, an anode 3 that comprises an Li metal, and an electrolyte 4 that conducts Li ions between the cathode 2 and the anode 3, are housed in a battery case that is composed of a cathode can 6 and an anode can 7. The cathode can 6 and the anode can 7 are fixed by a gasket 8 to encapsulate the battery case.

The cathode 2 is an oxidation-reduction reaction site for oxygen. Air (oxygen) introduced through an air vent 9, which is provided to the cathode can 6, is supplied to the cathode. The cathode 2 comprises at least the carbonaceous material of the present invention.

A cathode current collector 5 is provided to the cathode 2, which functions to collect current from the cathode 2. The cathode current collector 5 is composed of a porous electro-conductive material (e.g., metal mesh) and allows air (oxygen), which is introduced through the air vent 9, to be supplied to the cathode 2 via the cathode current collector 5.

The anode 3 comprises an Li metal, which is an anode active material, and it can occlude/release Li ions, which are conductive ion species.

The electrolyte 4 comprises a liquid electrolyte of a supporting electrolyte salt (e.g., Li salt such as $LiN(SO_2CF_3)_2$) dissolved in a non-aqueous solvent (e.g., N-methyl-N-propylpiperidinium bis(trifluoromethanesulfonyl)amide). An insulating porous separator (not shown) is provided between the cathode 2 and the anode 3, and the pores of the porous separator are impregnated with the electrolyte.

Hereinafter, the components of the lithium-air battery will be described.

(Cathode)

The cathode comprises at least the carbonaceous material of the present invention. The cathode can be composed of only the carbonaceous material of the present invention. By forming the carbonaceous material of the present invention into a form that allows the use of the material as a cathode, such as a plate form, the cathode can be composed of only the carbonaceous material of the present invention. Or, by using a binder, the powdery or fibrous carbonaceous material of the present invention can be formed into a form that allows the use of the material as a cathode.

The carbonaceous material of the present invention will not be described here since it is described above.

In the cathode, the content of the carbonaceous material of the present invention is not particularly limited. For example, when the total weight of the cathode is 100 wt % and the cathode is composed of only the carbonaceous material of the present invention, the content of the carbonaceous material is 100 wt %.

On the other hand, when the powdery or fibrous carbonaceous material of the present invention is used, the content is preferably 40 to 95 wt %, particularly preferably 55 to 90 wt %. When the content of the carbonaceous material is less than 40 wt %, the electroconductivity of the cathode is not sufficient, so that the internal resistance of a lithium-air battery may be increased, and the power output may be decreased. When the content of the carbonaceous material is more than 95 wt %, the shape stability of the cathode may be insufficient.

As needed, the cathode can contain an electroconductive material other than the carbonaceous material of the present invention, a binder, a catalyst, etc.

Examples of the binder include polyvinylidene fluoride (PVdF), polytetrafluoroethylene (PTFE) and styrene-butadiene rubber (SBR). The content of the binder in the cathode is not particularly limited. However, the content preferably accounts for 5 to 60 wt % of the cathode.

The electroconductive material is only needed to be electroconductive. For example, there may be mentioned electroconductive carbonaceous materials including carbon black such as Ketjen Black and acetylene black, and carbon fibers such as carbon nanotubes.

Examples of the catalyst include platinum group metals such as nickel, palladium and platinum; perovskite-type oxides containing a transition metal such as cobalt, manganese or iron; inorganic compounds containing a noble metal oxide such as ruthenium, iridium or palladium; metal-coordinated organic compounds having a porphyrin or phthalocyanine structure; inorganic ceramics such as manganese dioxide ($MnO_2$) and cerium oxide ($CeO_2$); and composite materials obtained by mixing these materials.

The thickness of the cathode varies depending on the application of the lithium-air battery, etc. For example, it is preferably within a range of 2 µm to 500 µm, particularly preferably within a range of 5 µm to 300 µm.

As needed, the cathode can comprise a cathode current collector that collects current from the cathode. The material for the cathode current collector is not particularly limited, as long as it is electroconductive. For example, there may be mentioned stainless-steel, nickel, aluminum, iron, titanium and carbon.

As the form of the cathode current collector, for example, there may be mentioned a foil form, a plate form and a fiber form, and also a porous form such as non-woven fabric or mesh (grid). In the case of using a porous current collector, as shown in FIG. 2, the cathode and the current collector can be stacked, or the current collector can be disposed inside the cathode. Or, the below-described battery case can also function as the cathode current collector.

The thickness of the cathode current collector is, for example, within a range of 10 µm to 1,000 µm, particularly preferably within a range of 20 µm to 400 µm.

The method for producing the cathode comprising the cathode current collector is not particularly limited. For example, there may be mentioned the following: a method of laminating the carbonaceous material of the present invention in a plate or foil form and the cathode current collector by stacking them and appropriately pressing them, for example; a method of applying a cathode material paste to the surface of the cathode current collector and drying the same, which is obtained by mixing at least the carbonaceous material of the present invention with a binder, etc., as needed; and a method of laminating the cathode, which is obtained by applying and drying the cathode material paste, and the cathode current collector by stacking them and then appropriately pressing or heating them, for example.

The solvent of the cathode material paste is not particularly limited and can be appropriately selected, as long as it is volatile. Concrete examples thereof include ethanol, acetone, N,N-dimethylformamide (DMF) and N-methyl-2-pyrrolidone (NMP).

The method for applying the cathode material paste is not particularly limited. A general method such as a doctor blade method or spraying method can be used.

(Anode)

The anode comprises an anode active material that can release/take in lithium ions. Examples of anode active materials include lithium metals, alloy materials containing lithium elements, and lithium compounds. Also, carbonaceous materials such as graphite and the carbonaceous material of the present invention can be used as the anode active material. Of them, lithium metals are preferred, since a high capacity and high potential can be obtained.

Examples of alloys containing lithium elements include lithium-aluminum alloy, lithium-tin alloy, lithium-lead alloy and lithium-silicon alloy. Examples of lithium compounds include oxides such as lithium-titanium oxide and nitrides such as lithium-cobalt nitride, lithium-iron nitride and lithium-manganese nitride.

The anode can be one containing only the anode active material, or it can be one containing the anode active material and at least one of an electroconductive material and a binder. For example, when the anode active material is in a foil or plate form, the anode can be an anode layer that contains only the anode active material. When the anode active material is in a powdery form, the anode can be an anode layer that contains the anode active material and a binder. Since the electroconductive material and the binder are the same as those described above under "Cathode", they will not be described here.

The anode can comprise an anode current collector that collects current from the anode. The material for the anode current collector is not particularly limited, as long as it is electroconductive. For example, there may be mentioned copper, stainless-steel, nickel and carbon. As the form of the anode current collector, for example, there may be mentioned a foil form, a plate form and a mesh (grid) form. In the present invention, the below-described battery case can also function as the anode current collector.

The method for producing the anode is not particularly limited. For example, there may be mentioned a method for stacking the anode active material in a foil form and the anode current collector and pressing them. Also, there may be mentioned a different method in which an anode material mixture containing the anode active material and the binder is prepared, and then the mixture is applied onto the anode current collector and dried.

(Electrolyte)

The electrolyte is retained between the cathode and the anode and functions to conduct lithium ions between the cathode and the anode.

The form of the electrolyte is not particularly limited, as long as it has lithium ion conductivity. For example, there may be used a liquid electrolyte, a solid electrolyte, a gel electrolyte, etc.

The liquid electrolyte is one obtained by dissolving an electrolyte salt in a solvent. As the liquid electrolyte, there may be used any one of a non-aqueous liquid electrolyte, which is obtained by dissolving an electrolyte salt in a non-aqueous solvent, or an aqueous liquid electrolyte, which is obtained by dissolving an electrolyte salt in an aqueous solvent.

The non-aqueous liquid electrolyte comprises a lithium salt and a non-aqueous solvent.

Examples of the lithium salt include inorganic lithium salts such as $LiPF_6$, $LiBF_4$, $LiClO_4$ and $LiAsF_6$, and organic lithium salts such as $LiCF_3SO_3$, $LiN(SO_2CF_3)_2$ (abbreviation: Li-TFSA), $LiN(SO_2C_2F_5)_2$ and $LiC(SO_2CF_3)_3$.

Examples of the non-aqueous solvent include ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, acetonitrile, 1,2-dimethoxymethane, 1,3-dimethoxypropane, diethyl ether, tetrahydrofuran, 2-methyltetrahydrofuran and mixtures thereof.

An ionic liquid can be used as the non-aqueous solvent. Examples of the non-ionic liquid include: aliphatic quaternary ammonium salts such as N,N,N-trimethyl-N-propylammonium bis(trifluoromethanesulfonyl)amide [abbreviation: TMPA-TFSA], N-methyl-N-propylpiperidinium bis(trifluoromethanesulfonyl)amide (abbreviation: PP13-TFSA), N-methyl-N-propylpyrrolidinium bis(trifluoromethanesulfonyl)amide (abbreviation: P13-TFSA), N-methyl-N-butylpyrrolidinium bis(trifluoromethanesulfonyl)amide (abbreviation: P14-TFSA) and N,N-diethyl-N-methyl-N-(2-methoxyethyl)ammonium bis(trifluoromethanesulfonyl)amide (abbreviation: DEME-TFSA); and 1-ethyl-3-methylimidazoliumfluorohydrogenate (trifluoromethanesulfonyl)amide [abbreviation: emim $(HF)_{2,3}F$-TFSA]. The ionic liquid is preferable from the viewpoint of having a high viscous tendency and preventing leaks of the liquid electrolyte.

The concentration of the lithium salt in the non-aqueous liquid electrolyte can be within a range of 0.3 mol/L to 3 mol/L, for example.

A non-aqueous gel electrolyte can be obtained by gelling a non-aqueous liquid electrolyte by adding a polymer thereto. As the polymer used for the gelation of the non-aqueous liquid electrolyte, there may be mentioned polyethylene oxide (PEO), polyacrylonitrile (PAN) or polymethyl methacrylate (PMMA), for example.

As an aqueous electrolyte, there may be mentioned an aqueous liquid electrolyte obtained by incorporating a lithium salt in water. Examples of the lithium salt include LiOH, LiCl, $LiNO_3$ and $CH_3CO_2Li$.

As the solid electrolyte, there may be used Li—La—Ti—O-based solid electrolyte, for example.

(Separator)

To secure insulation between the cathode and the anode, a separator comprising an insulating porous material can be provided between the cathode and the anode. Typically, by impregnating the separator comprising an insulating porous material with an electrolyte, insulation and lithium ion conductivity between the cathode and the anode can be secured.

In the case of having a structure in which a plurality of laminates are stacked, each of which comprises the cathode, electrolyte and anode in this sequence (cathode/electrolyte/anode), from the viewpoint of safety, it is preferable to provide the separator between the laminates, that is, between the cathode and anode of adjacent laminates.

As the separator, for example, there may be mentioned porous films of polyethylene, polypropylene, etc., and non-woven fabrics such as resin non-woven fabric and glass fiber non-woven fabric.

(Battery Case)

In general, the lithium-air battery comprises a battery case for housing the cathode, anode, electrolyte, etc. Concrete examples of the form of the battery case include a coin form, a flat plate form, a cylindrical form and a laminate form. As long as oxygen can be supplied to the cathode, the battery case can be an open battery case which has a vent (air vent) that can take in oxygen from the outside. Or, the battery case can be a closed battery case.

The open battery case has a structure in which at least the cathode can be sufficiently in contact with oxygen-containing gas. On the other hand, to the closed battery case, oxygen-containing gas inlet and outlet tubes can be provided. As the oxygen-containing gas to be supplied to the cathode, for example, there may be mentioned pure oxygen and air. Preferred is pure oxygen from the point of view that a high oxygen concentration is preferred.

EXAMPLES

Production of Carbonaceous Material

Examples 1 to 4 and Comparative Example 1

Figure 3:
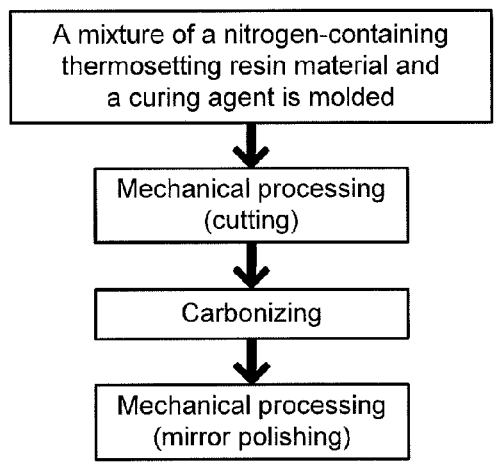
FIG. 3 is a view showing the cathode production process of Examples 1 to 4 and Comparative Example 1.

Based on the flow shown in FIG. 3, a carbonaceous material was produce as follows.

As a starting material for the carbonaceous material, a nitrogen-containing resole-type phenol resin in a liquid form (product name: Phenolite; manufactured by: DIC) (nitrogen-containing thermosetting resin material) was used. The resin was mixed with sulfuric acid, which is a curing agent, at a ratio of 90:10 (wt %).

Next, the mixture of the nitrogen-containing resole-type phenol resin and sulfuric acid was formed into sheets. The thus-obtained sheets were stacked and molded by the roll-to-roll method. After molding, the resultant was infusibilized by heating (at 300° C. for 3 hours) under an oxygen atmosphere (oxygen concentration 60 vol %) and then cut to obtain resin material molded products each having an outer diameter of 12 mm and a thickness of 1 mm.

Then, the resin material molded products were carbonized by heating from room temperature to temperatures (Example 1: 600° C.; Example 2: 800° C.; Example 3: 1,000° C.; Example 4: 1,500° C.; Comparative Example 1: 3,000° C.) in vacuum (0.1 MPa) and at a heating rate of 10° C./min.

The surfaces of the thus-obtained carbonaceous materials were subjected to mirror polishing. The mirror polishing was carried out by using a polishing solution which contains water and an abrasive and in which 10% pulverized alumina grains having an average particle diameter of 2 μm or less are dispersed. The mirror condition of each surface was confirmed with an image measuring device. Also, the tolerance was measured with a micrometer. As a result, the carbonaceous materials were found to have an outer diameter of 0.2 mm and a thickness of 0.1 mm.

[Carbonaceous Material Evaluation 1]

For the carbonaceous materials of Examples 1 to 4 and Comparative Example 1, the N/C ratio, pyrrole/C ratio, pyridine/C ratio, G/D ratio, planar spacing, a-axis crystallite size, c-axis crystallite size and resistance were measured as follows.

(N/C Ratio)

The molar ratio of the nitrogen to the carbon contained in each carbonaceous material (the N/C ratio) was measured by X ray photoelectron spectroscopy (with ESCA-3300 manufactured by Shimadzu Corporation). The results are shown in Table 1.

(Pyrrole/C Ratio)

The molar ratio of the pyrrole to the carbon contained in each carbonaceous material (the pyrrole/C ratio) was measured as follows. The results are shown in Table 1.

First, the N/C ratio was measured by X ray photoelectron spectroscopy (XPS method). On the other hand, by the XPS method, multiple peak separation was carried out on the four components (pyridine component, pyrrole component, oxide component and quaternary component) of an N1s spectrum, and the pyrrole ratio in the nitrogen (the pyrrole/N ratio) was calculated. Next, the pyrrole/C ratio was calculated from the measured N/C ratio and pyrrole/N ratio.

(Pyridine/C Ratio)

The ratio of the pyridine to the carbon contained in each carbonaceous material (the pyridine/C ratio) was measured as follows. The results are shown in Table 1.

First, the N/C ratio was measured by X ray photoelectron spectroscopy (XPS method). On the other hand, by the XPS method, multiple peak separation was carried out on the four components (pyridine component, pyrrole component, oxide component and quaternary component) of an N1s spectrum, and the pyridine ratio in the nitrogen (the pyridine/N ratio) was calculated. Next, the pyridine/C ratio was calculated from the measured N/C ratio and pyridine/N ratio.

TABLE 1

|  | N/C ratio | Pyrrole/C ratio | Pyridine/C ratio |
| --- | --- | --- | --- |
| Example 1 | $2.19 \times 10^{-2}$ | $1.42 \times 10^{-2}$ | $0.48 \times 10^{-2}$ |
| Example 2 | $2.28 \times 10^{-2}$ | $1.57 \times 10^{-2}$ | $0.46 \times 10^{-2}$ |
| Example 3 | $2.00 \times 10^{-2}$ | $1.48 \times 10^{-2}$ | $0.48 \times 10^{-2}$ |
| Example 4 | $1.94 \times 10^{-2}$ | $1.47 \times 10^{-2}$ | $0.41 \times 10^{-2}$ |
| Comparative Example 1 | 0 | 0 | 0 |

(G/D Ratio)

Figure 4:
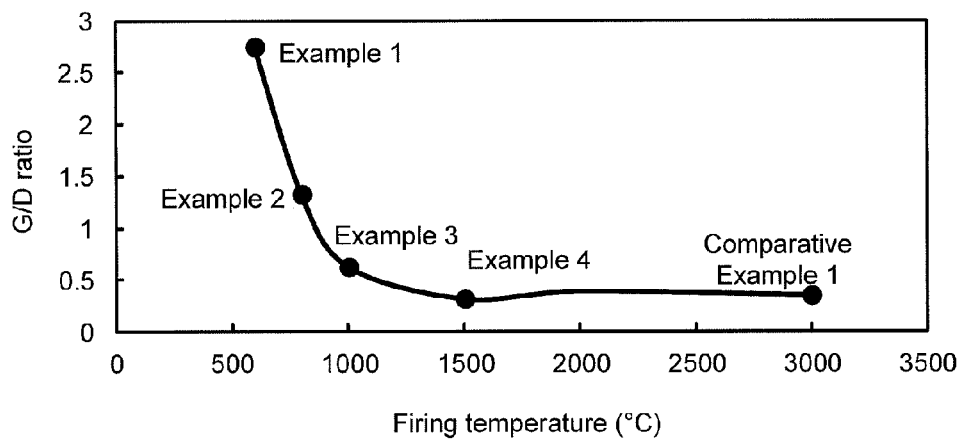
FIG. 4 is a graph showing the relationship between the firing temperature and G/D ratio of Examples 1 to 4 and Comparative Example 1.

After argon laser was applied to each carbonaceous material for 200 seconds, Raman spectrum measurement was carried out on one hundred points at 5 μm intervals, and the area ratio of the defect-derived D band to the graphite-derived G band (=the peak area of G band/the peak area of D band) was calculated. The results are shown in Table 2 and FIG. 4.

(002 Planar Spacing)

Figure 5:
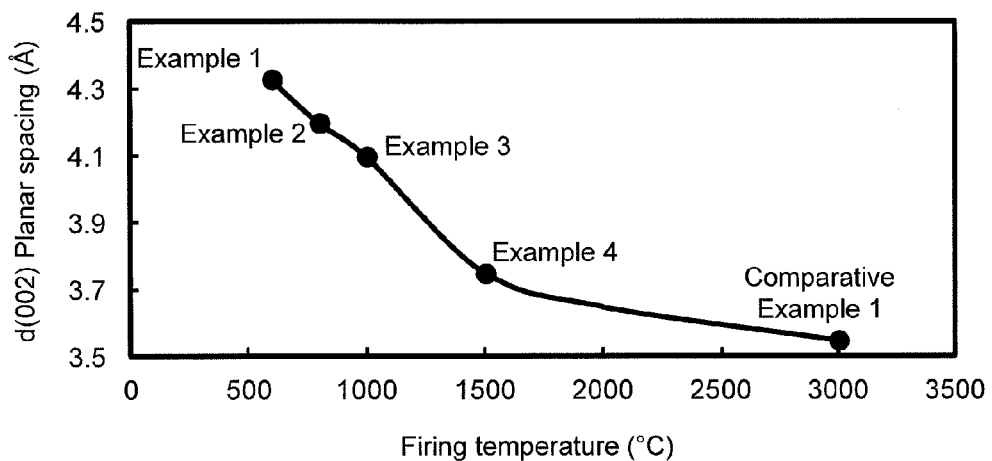
FIG. 5 is a graph showing the relationship between the firing temperature and 002 planar spacing of Examples 1 to 4 and Comparative Example 1.

In accordance with JIS R7651, the average 002 planar spacing was measured by X-ray diffraction. The results are shown in Table 2 and FIG. 5.

(a-Axis Crystallite Size and c-Axis Crystallite Size)

Figure 6:
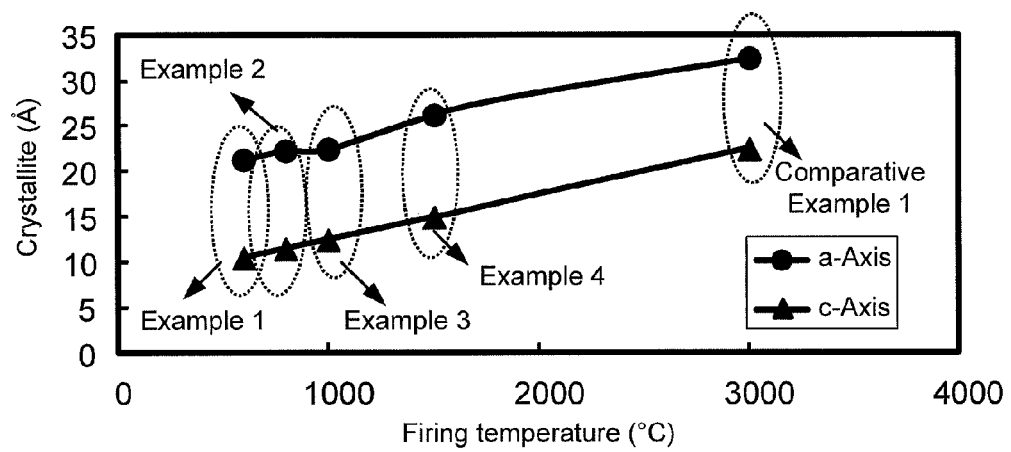
FIG. 6 is a graph showing the relationship between the firing temperature, a-axis crystallite size and c-axis crystallite size of Example 1 to 4 and Comparative Example 1.

In accordance with JIS R7651, the size of crystallites in the a-axis direction and the size of crystallites in the c-axis direction were measured by X-ray diffraction. The results are shown in Table 2 and FIG. 6.

(Resistance)

Figure 7:
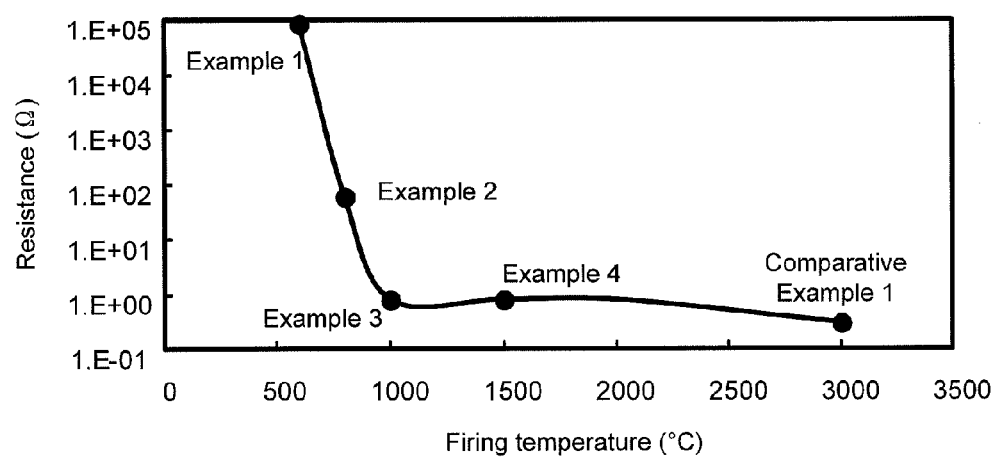
FIG. 7 is a graph showing the relationship between the firing temperature and electrical resistance of Examples 1 to 4 and Comparative Example 1.

Each test species was sandwiched between metal plates having a diameter of 20 mm. With applying a pressure of 0.32 kgf/cm$^2$, the electrical resistance was measured by the two-terminal method. The results are shown in Table 2 and FIG. 7.

TABLE 2

|  | G/D ratio | 002 Planar spacing (Å) | a-Axis crystallites (Å) | c-Axis crystallites (Å) | Resistance (Ω) |
| --- | --- | --- | --- | --- | --- |
| Example 1 | 2.75 | 4.33 | 21.3 | 10.5 | 83,400 |
| Example 2 | 1.33 | 4.2 | 22.3 | 11.5 | 60.3 |
| Example 3 | 0.63 | 4.1 | 22.5 | 12.5 | 0.8 |
| Example 4 | 0.32 | 3.75 | 26.3 | 15 | 0.8 |
| Comparative Example 1 | 0.32 | 3.55 | 32.5 | 22.5 | 0.3 |

[Carbonaceous Material Evaluation 2]

Figure 8A:
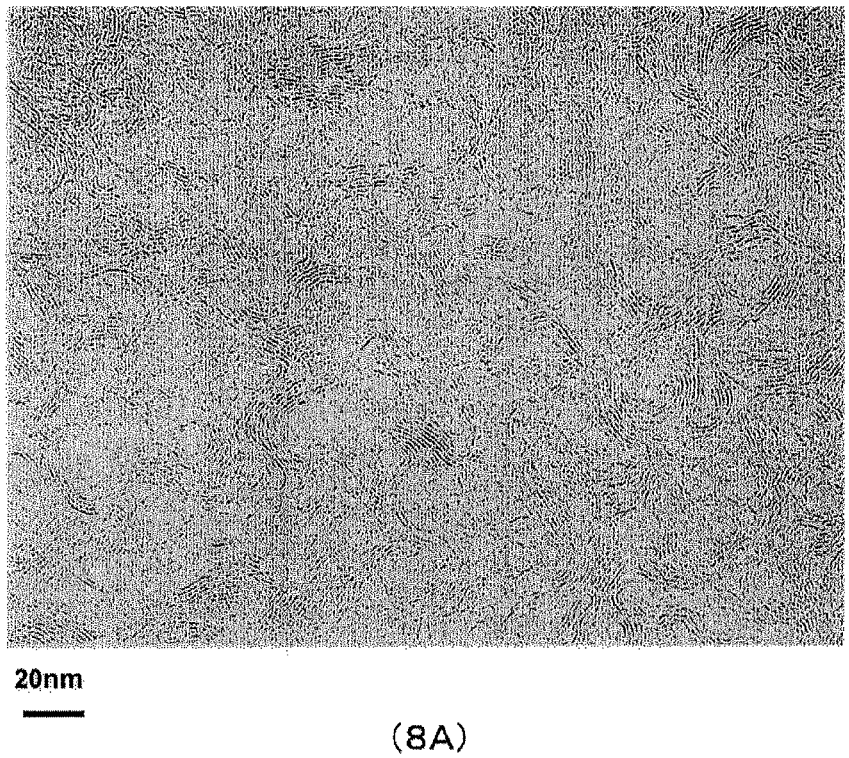
FIG. 8A is a TEM image of the surface of the carbonaceous material of Example 3.
Figure 8B:
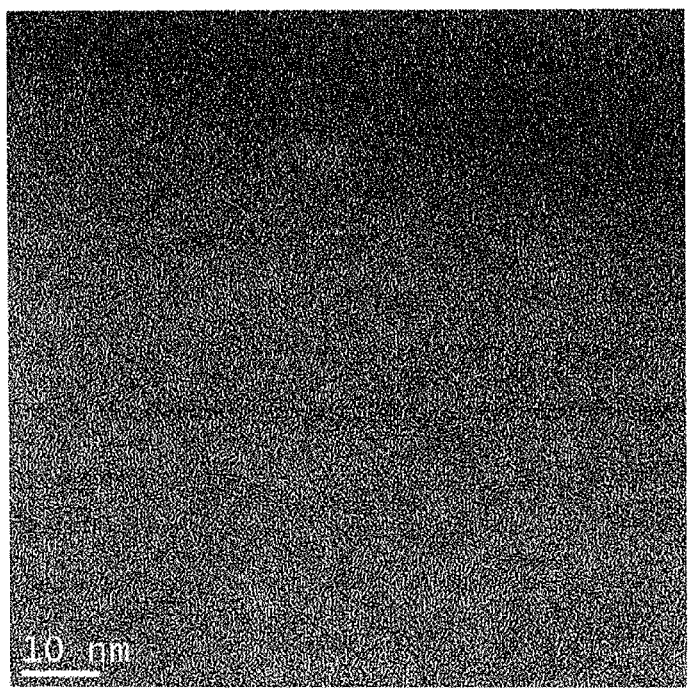
FIG. 8B is a TEM image of the surface of carbonaceous material of Comparative Example 1.

TEM observation was carried out on the carbonaceous materials of Examples 1 to 4 and Comparative Example 1. TEM image of Example 3 is shown in FIG. 8A, and TEM image of Comparative Example 1 is shown in FIG. 8B. It was confirmed that all the carbonaceous materials of Examples 1 to 4 have a complex glassy network structure as shown in FIG. 8A. On the other hand, it was confirmed that the carbonaceous material of Comparative Example 1 has an isotropic structure as shown in FIG. 8B, and a dense framework is present therein.

Carbonaceous Material Evaluation 3

Examples 1 to 4 and Comparative Example 1

Lithium-air batteries were produced by using the mirror-polished carbonaceous materials of Examples 1 to 4 and Comparative Example 1 as they were as the cathode. A charge-discharge test was carried out thereon as follows.

Figure 9:
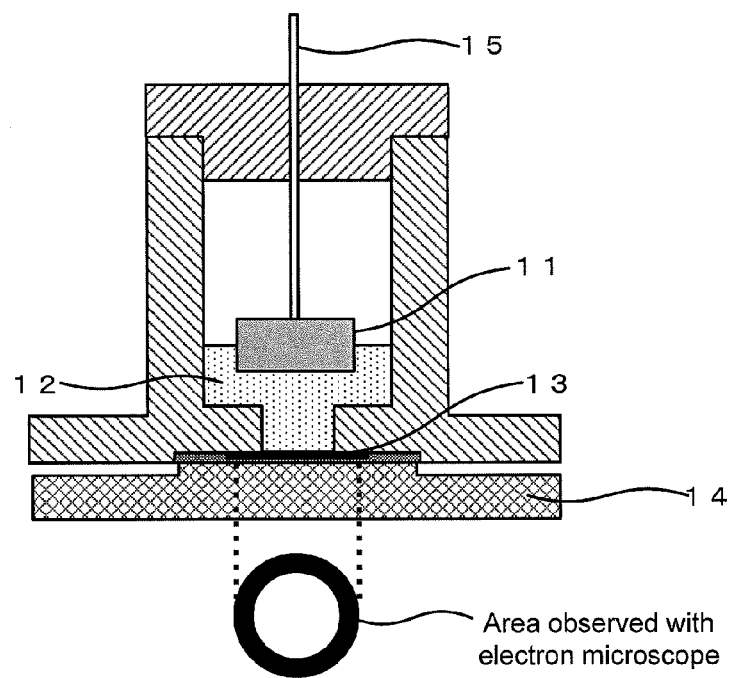
FIG. 9 is a schematic sectional view of a lithium-air battery cell used in a charge-discharge test of Example 1 to 4 and Comparative Example 1 and 2.

First, lithium-air battery cells shown in FIG. 9 were produced as follows, by using the above-produced carbonaceous materials of Examples 1 to 4 and Comparative Example 1 as the cathode. More specifically, a lithium metal foil (manufactured by Kyokuto Kinzoku Ltd., thickness 200 μm, φ15 mm) was used as an anode 11; a solution of LiTFSA in PP13-TFSA (LiTFSA concentration 0.32 mol/kg) was used as a liquid electrolyte 12; and a polypropylene non-woven fabric (JH1004N manufactured by Asahi Kasei Corporation) was used as a separator (not shown). As shown in FIG. 9, an SUS current collector 14 (cathode current collector) was provided to the carbonaceous material, which is a cathode 13, and a nickel wire 15 (anode current collector) was provided to the lithium metal foil, which is the anode 11. The liquid electrolyte 12 was infiltrated into the separator.

The thus-obtained cell was housed in a glass desiccator (500 mL) equipped with a gas replacement cock. The glass desiccator has such a structure that oxygen can be introduced therein and supplied to the cathode.

Next, a charge-discharge test was carried out under the following conditions. Discharging capacity and coulombic efficiency (discharging capacity/charging capacity) are shown in Table 3 and FIG. 10. Table 3 also shows the N/C ratio, pyrrole/C ratio and pyridine/C ratio.

<Charge-Discharge Test Conditions>
Charge-discharge device: Multichannel potentiostat/galvanostat (VMP3 manufactured by Bio-Logic)
Current density: $6.37 \times 10^{-5}$ mA/cm$^2$ (Current value was set to 50 nA per electrode area of $\phi$10 mm)
End-of-charge/discharge voltage: 2 V to 3.85 V (one cycle)
Atmosphere temperature (the temperature inside the glass desiccator): 60° C. (Before starting the test, the cell was stood for 3 hours in a constant temperature bath at 60° C.)
Pressure inside the cell upon charging/discharging: Oxygen ($O_2$) at 1 atmosphere FIG. 11A is a scanning electron microscopy (SEM) image of the cathode surface of Example 1, which was taken after discharging. FIG. 11B is a scanning electron microscopy (SEM) image of the cathode surface of Example 1, which was taken after charging (charging after discharging). FIG. 12A is an SEM image of the cathode surface of Comparative Example 1, which was taken after discharging. FIG. 12B is an SEM image of the cathode surface of Comparative Example 1, which was taken after charging (charging after discharging).

From FIGS. 11A, 11B, 12A, and 12B, it was confirmed that precipitates found on the cathode comprising the carbonaceous material of Example 1 after discharging, are smaller than those on the cathode comprising the carbonaceous material of Comparative Example 1, and the smaller precipitates were eliminated (decomposed) by charging. On the other hand, on the cathode comprising the carbonaceous material of Comparative Example 1, large precipitates were produced by discharging and remained on the electrode surface even after charging. From this result, it can be said that the deterioration of the cathode comprising the carbonaceous material of Example 1 is smaller than the cathode comprising the carbonaceous material of Comparative Example 1.

FIG. 13A is an SEM image of the cathode surface of Example 3, which was taken before the charge-discharge test. FIG. 13B is an SEM image of the cathode surface of Example 3, which was taken after the charge-discharge test.

From FIGS. 13A and 13B, it was confirmed that small precipitates were produced on the surface of the cathode comprising the carbonaceous material of Example 3, by charging/discharging. However, since the surface of the cathode was kept smooth, it can be said that the deterioration of the cathode is small.

Comparative Example 2

First, a cathode was produced as follows. In particular, a cathode material paste was prepared by mixing carbon black (Ketjen Black ECP600JD) with polytetrafluoroethylene (binder) in ethanol (solvent). In the cathode material paste, the ratio between the carbon black and polytetrafluoroethylene is as follows: carbon black:polytetrafluoroethylene=90 wt %:10 wt %. Then, the cathode material paste was applied onto a substrate and roll-pressed. Next, the paste was dried in vacuum at 60° C. (pre-drying). Then, the dried paste was cut and further dried in vacuum at 120° C. (final drying). The thus-obtained cathode was removed from the substrate.

Next, in the same manner as Examples 1 to 4, a lithium-air battery cell was produced by using the thus-obtained cathode and a charge-discharge test was carried out thereon.

FIG. 14A is an SEM image of the cathode surface of Comparative Example 2, which was taken before the charge-discharge test. FIG. 14B is an SEM image of the cathode surface of Comparative Example 2, which was taken after the charge-discharge test.

From FIGS. 14A and 14B, it was confirmed that large convexoconcaves were formed on the electrode surface by charging and discharging, which was flat before the charging and discharging. This is considered to be due to the production of precipitates, the decomposition of the carbonaceous material, etc., and it can be said that is the cathode is significantly deteriorated. Especially compared to Example 3 shown in FIGS. 13A and 13B, it is clear that the convexoconcaves are larger, and the deterioration is severer.

TABLE 3

| | N/C ratio | Pyrrole/C ratio | Pyridine/C ratio | Discharging capacity (mAh) | Coulombic efficiency (%) |
|---|---|---|---|---|---|
| Example 1 | $2.19 \times 10^{-2}$ | $1.42 \times 10^{-2}$ | $0.48 \times 10^{-2}$ | 0.80 | 20 |
| Example 2 | $2.28 \times 10^{-2}$ | $1.57 \times 10^{-2}$ | $0.46 \times 10^{-2}$ | 1.0 | 10 |
| Example 3 | $2.00 \times 10^{-2}$ | $1.48 \times 10^{-2}$ | $0.48 \times 10^{-2}$ | 3.0 | 20 |
| Example 4 | $1.94 \times 10^{-2}$ | $1.47 \times 10^{-2}$ | $0.41 \times 10^{-2}$ | 2.7 | 2 |
| Comparative Example 1 | 0 | 0 | 0 | 0.40 | 10 |

As described above under "Carbonaceous material evaluation 2", while the carbonaceous material of Comparative Example 1 is not glassy, all the carbonaceous materials of Examples 1 to 4 were confirmed to be glassy carbonaceous materials by the TEM observation. Also from Table 3, it is clear that the lithium-air batteries using the carbonaceous materials of Examples 1 to 4 as the cathode, which have an N/C ratio of $1.9 \times 10^{-2}$ or more, have better discharging capacities than the carbonaceous material of Comparative Example 1, which contains no nitrogen. From these results, it is clear that the discharge characteristics of a lithium-air battery can be enhanced by using the glassy carbonaceous material having an N/C ratio of $1.9 \times 10^{-2}$ or more, as a material for constituting the cathode of a lithium-air battery.

Figure 16:
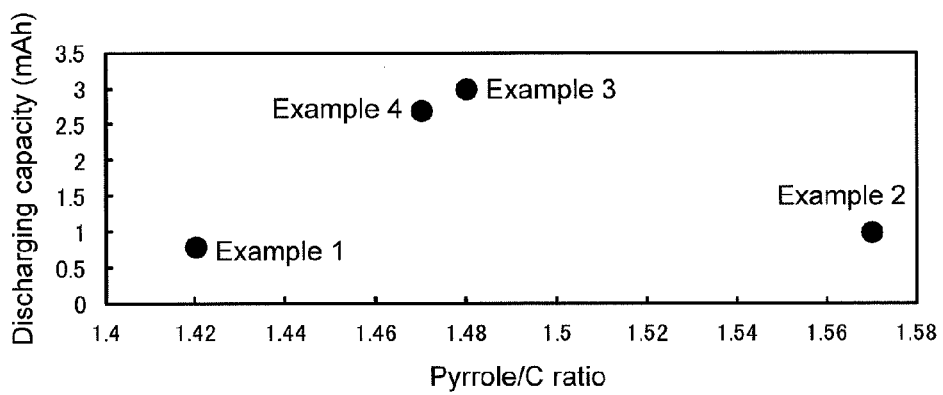
FIG. 16 is a graph showing the relationship between the pyrrole/C ratio and discharging capacity of Examples 1 to 4.
Figure 17:
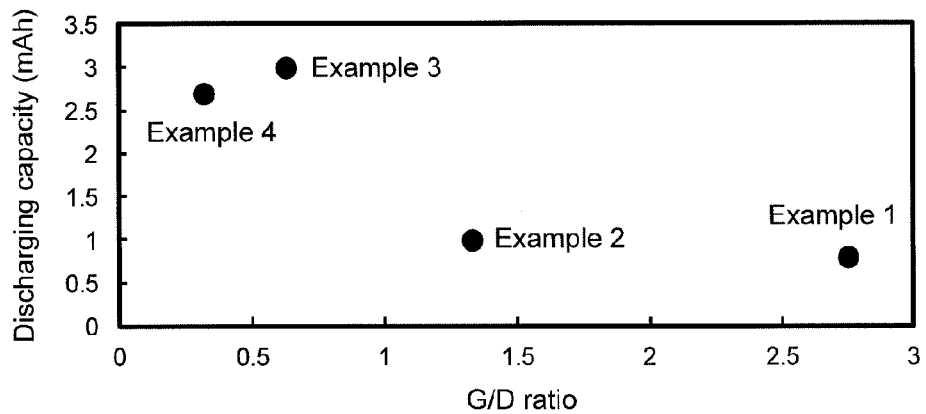
FIG. 17 is a graph showing the relationship between the G/D ratio and discharging capacity of Examples 1 to 4.

FIG. 15 shows the relationship between the N/C ratio and discharging capacity. FIG. 16 shows the relationship between the pyrrole/C ratio and discharging capacity. FIG. 17 shows the relationship between the G/D ratio and discharging capacity.

From FIG. 15 and Table 3, it is clear that particularly excellent discharging capacities can be obtained when the N/C ratio is $1.90 \times 10^{-2}$ to $2.10 \times 10^{-2}$, particularly when the N/C ratio is $1.94 \times 10^{-2}$ to $2.00 \times 10^{-2}$. From FIG. 16 and Table 3, it is clear that excellent discharging capacities can be obtained when the pyrrole/C ratio is $1.44 \times 10^{-2}$ to $1.52 \times 10^{-2}$, particularly when the pyrrole/C ratio is $1.47 \times 10^{-2}$ to $1.48 \times 10^{-2}$. From FIG. 17 and Tables 2 and 3, it is clear that excellent discharge characteristics can be obtained when the G/D ratio is 1.5 or less, particularly when the G/D ratio is 0.7 or less.

Figure 18:
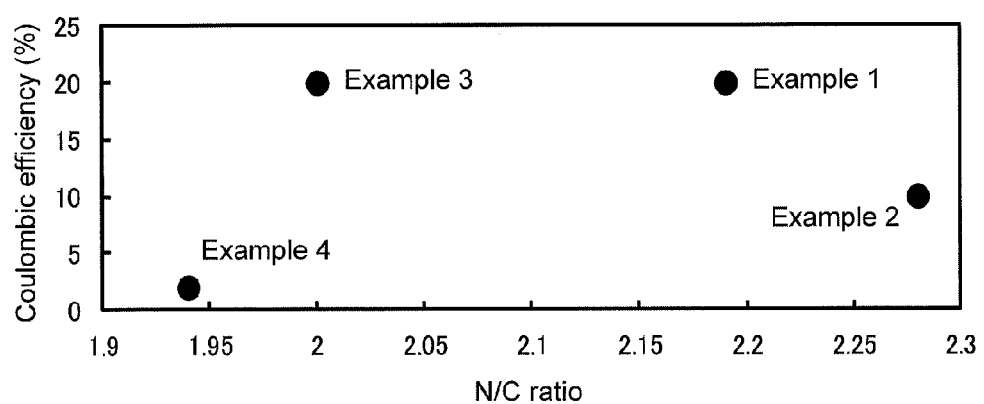
FIG. 18 is a graph showing the relationship between the N/C ratio and coulombic efficiency of Examples 1 to 4.
Figure 19:
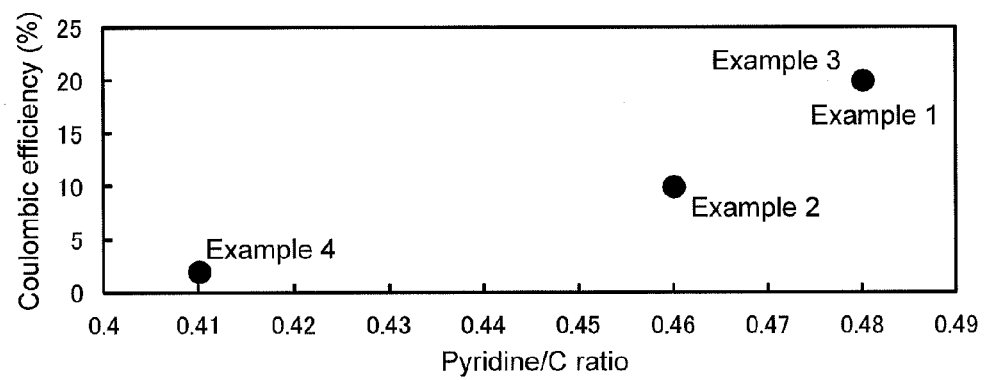
FIG. 19 is a graph showing the relationship between the pyridine/C ratio and coulombic efficiency of Examples 1 to 4.

FIG. 18 shows the relationship between the N/C ratio and coulombic efficiency. FIG. 19 shows the relationship between the pyridine/C ratio and coulombic efficiency.

From FIG. 18, it is clear that both the discharging capacity and coulombic efficiency are excellent when the N/C ratio is $1.95 \times 10^{-2}$ to $2.25 \times 10^{-2}$, particularly when the N/C ratio is $2.00 \times 10^{-2}$ to $2.19 \times 10^{-2}$. From FIG. 19, it is clear that excellent coulombic efficiencies can be obtained when the pyridine/C ratio is $0.47 \times 10^{-2}$ to $0.50 \times 10^{-2}$, particularly when the pyridine/C ratio is $0.48 \times 10^{-2}$.

For Examples 1 to 4, the following can be said from the above discharging capacity results and the results of FIGS. 4 to 7.

That is, as the firing temperature increases, the G/D ratio, the planar spacing and the electrical resistance tend to decrease. On the other hand, as the firing temperature increases, the size of crystallites in the a-axis direction and the size of crystallites in the c-axis direction tend to increase. The discharging capacity is high when the G/D ratio is 1.5 or less, particularly when the G/D ratio is 0.7 or less, and when the planar spacing is 3.7 to 4.2 Å, particularly when the planar spacing is 3.75 to 4.1 Å. Also, the discharging capacity is high when the size of crystallites in the a-axis direction is 22 to 27 Å, particularly when the size is 22.5 to 26.3 Å, and when the size of the crystallites in the c-axis direction is 11 to 16 Å, particularly when the size is 12.5 to 15 Å.

REFERENCE SIGNS LIST

1. Precipitate
2. Cathode
3. Anode
4. Electrolyte
5. Cathode current collector
6. Cathode can
7. Anode can
8. Gasket
9. Air vent
10. Air-metal battery
11. Anode
12. Liquid electrolyte
13. Cathode
14. Cathode current collector
15. Anode current collector

The invention claimed is:

1. A carbonaceous material for lithium-air battery cathodes,
    wherein the carbonaceous material is a carbonaceous material for constituting the cathode of a lithium-air battery;
    wherein the carbonaceous material comprises nitrogen and a molar ratio of the nitrogen to the carbon is $1.9 \times 10^{-2}$ to $2.25 \times 10^{-2}$; and
    wherein the carbonaceous material is a glassy material.

2. The carbonaceous material for lithium-air battery cathodes according to claim 1, wherein the molar ratio of the nitrogen to the carbon is $1.90 \times 10^{-2}$ to $2.10 \times 10^{-2}$.

3. The carbonaceous material for lithium-air battery cathodes according to claim 1, wherein the molar ratio of the nitrogen to the carbon is $1.95 \times 10^{-2}$ to $2.25 \times 10^{-2}$.

4. The carbonaceous material for lithium-air battery cathodes according to claim 1, wherein the carbonaceous material comprises pyrrole and a molar ratio of the pyrrole to the carbon is $1.44 \times 10^{-2}$ to $1.52 \times 10^{-2}$.

5. The carbonaceous material for lithium-air battery cathodes according to claim 1, wherein the carbonaceous material comprises pyridine and a molar ratio of the pyridine to the carbon is $0.47 \times 10^{-2}$ to $0.50 \times 10^{-2}$.

6. A lithium-air battery comprising a cathode, an anode and an electrolyte disposed between the cathode and the anode, wherein the cathode comprises the carbonaceous material defined by claim 1.

* * * * *